United States Patent [19]

Amstutz et al.

[11] Patent Number: 4,608,558

[45] Date of Patent: Aug. 26, 1986

[54] ADDRESSING METHOD FOR A MULTIPLEXABLE, BISTABLE LIQUID CRYSTAL DISPLAY

[75] Inventors: Hermann Amstutz, Mellingen; Meinolph Kaufmann, Baden; Terry J. Scheffer, Forch, all of Switzerland

[73] Assignee: BBC Brown, Boveri & Company, Limited, Baden, Switzerland

[21] Appl. No.: 534,715

[22] Filed: Sep. 22, 1983

[30] Foreign Application Priority Data

Sep. 23, 1982 [DE] Fed. Rep. of Germany ........ 3235143
May 24, 1983 [EP] European Pat. Off. ......... 83105107.3
Sep. 14, 1983 [EP] European Pat. Off. ......... 83201319.7

[51] Int. Cl.$^4$ ................................................. G09G 3/34
[52] U.S. Cl. .................................... 340/784; 340/802; 350/350 S
[58] Field of Search .................... 340/784, 805, 802; 350/349, 341, 340, 350 R, 346, 350.5

[56] References Cited

U.S. PATENT DOCUMENTS

| | | | |
|---|---|---|---|
| 3,982,239 | 9/1976 | Shen | 340/784 X |
| 4,040,721 | 8/1977 | Kurita | 340/784 X |
| 4,062,626 | 12/1977 | Kawakami et al. | 340/784 X |
| 4,191,955 | 3/1980 | Robert | 340/805 X |
| 4,212,010 | 7/1980 | Walter | 340/784 |
| 4,252,417 | 2/1981 | Scheffer et al. | 350/349 |
| 4,272,162 | 6/1981 | Togashi et al. | 350/349 |
| 4,291,948 | 9/1981 | Crossland et al. | 350/341 X |
| 4,400,059 | 8/1983 | Nagae et al. | 350/349 X |
| 4,481,511 | 11/1984 | Hanmura et al. | 340/784 X |
| 4,490,015 | 12/1984 | Kawarada et al. | 350/349 |

Primary Examiner—Marshall M. Curtis
Assistant Examiner—Vincent P. Kovalick
Attorney, Agent, or Firm—Oblon, Fisher, Spivak, McClelland & Maier

[57] ABSTRACT

An addressing method for a multiplexable, bistable liquid crystal display wherein a first driving voltage which is larger than a first limiting voltage is applied to the selected display elements and a second driving voltage which is smaller than a second limiting voltage is applied to the non-selected display elements. For the first driving voltage only a first optical state is stable, and for the second driving voltage only a second optical state is stable. All the display elements are simultaneously switched on the display by means of a single writing voltage pulse. By this means a high-contrast, constant and immediate display is achieved over the entire active area. Row-at-a-time writing is also possible. Moreover, a liquid crystal display is introduced which is based upon the bistability effect and which employs a guest-host liquid crystal containing a chiral additive. The layer thickness of the liquid crystal is less than 10 μm and the ratio of the layer thickness (d) to the liquid crystal pitch (p) of the guest-host liquid crystal lies between 0.5 and 1.75. Spacer particles are distributed over the entire active area of the display.

16 Claims, 14 Drawing Figures

ADDRESSING METHOD FOR A MULTIPLEXABLE, BISTABLE LIQUID CRYSTAL DISPLAY

BACKGROUND OF THE INVENTION

1. Field of the Invention:

This invention relates to an addressing method for a multiplexable, bistable liquid crystal display of the type known from the U.S. Pat. No. 4,317,115 and to a display of the type known from the U.S. Pat. No. 4,272,162.

2. Description of the Prior Art

A bistable liquid crystal display differs from the usual liquid crystal display in that its brightness-voltage curve exhibits hysteresis behavior. This means that there are two possible optical states within a certain range of applied voltages. The liquid crystals used in such displays consist of, for example, a nematic liquid crystal doped with a chiral additive. Upon applying a voltage in the range mentioned above, a display element adopts either one of two optically-distinguishable states, e.g. dark or bright, depending upon which branch of the hysteresis loop that particular display element is on. This bistability effect is employed in the U.S. Pat. No. 4,317,115. The addressing scheme described in this patent employs a holding voltage where the display elements of a liquid crystal matrix display can adopt two different optical states (dark or bright). Certain elements can be transformed into the bright optical state by applying a writing voltage to them. The holding voltage is then again applied and these display elements stay in this (bright) optical state. The holding voltage is the root-mean-square value of the voltage difference between the multiplexing signals applied to the row and column electrodes corresponding to that display element. Because this holding voltage and the writing voltage must lie very close together for high multiplexing rates, the contrast ratio for this addressing method is not particularly good. For this reason the display area is subdivided into a scanning region, which comprises five lines, and a holding region, which comprises the lines already written and the new lines which are to be written. The display elements in the scanning region lie at a higher holding voltage then the display elements in the holding region. By means of a writing voltage whose amplitude is larger than the higher holding voltage, the selected display elements are transferred into the bright optical state. The non-selected display elements remain in the dark optical state.

Disregarding the technical difficulties that such a subdivision of the display introduces, this known process has the disadvantage that the display can only be written in one region at a time. This is a relatively slow process because the display elements of the scanning region must fully respond to the applied driving voltage before the next region can be written.

A second serious disadvantage of this known addressing scheme is that the display still does not have an optimum contrast ratio. Detailed investigations have shown that for certain holding voltages the optically bright state spontaneously transforms to the optically dark state after a period of time, and that this storage time is dependent on the value of the holding voltage. In particular, the storage time of the optically bright state decreases as the holding voltage is decreased. The display must therefore be continually refreshed, say every 10 seconds, even when no further changes are made on the displayed information. This refreshing process introduces undesirable flicker effects.

The display described in the U.S. Pat. No. 4,272,162 employs the White and Taylor effect (see, for example, U.S. Pat. No. 3,551,026). The display consists of two parallel, transparent substrate plates upon which are arranged electrode layers and orientation layers. The orientation of the liquid crystal is obtained through the oblique evaporation of SiO. The pretilt angle of the liquid crystal optic axis on the orienting layer is about 45°. The liquid crystal that is filled into the display cell consists of a nematic liquid crystal mixture having positive dielectric anisotropy, a pleochroic dye and a chiral additive. A liquid crystal layer thickness of about 10 $\mu$m and a chiral pitch of about 5.7 $\mu$m is chosen in order to eliminate the so-called "storage effect" of this display. It follows from these values that the thickness-to-pitch ratio is about 1.75.

A liquid crystal display is described in J. Appl. Phys., Vol. 53, No. 12 (December 1982) pages 8599–8606 which has two crossed polarizers and which is based on the bistability effect. This display possesses substrate plates having orienting layers produced by the oblique evaporation of SiO. The pretilt angle of the liquid crystal molecules measured with respect to the normal to the substrate amounts to about 55°. The liquid crystal layer has a thickness of either 15.2 $\mu$m or 15.7 $\mu$m. The liquid crystal consists of a cyano-biphenyl mixture with the cholesteric additive cholesteryl nonanoate. The pitch of the liquid crystal is about the same as the thickness of the layer. The total twist angle of the liquid crystal molecules in going from one substrate to the other amounts to 360°. The display is transformed into the optically bright state by applying a voltage that lies above a certain critical value. This state slowly passes into the optically dark state, a process which is initiated by dust particles or other cell imperfectons, and then spreads over the entire display area. This effect causes the displayed information to fade away with time (see FIG. 5 in this article). The display must therefore be refreshed constantly at definite time intervals.

For this reason the display mentioned above should have a very precise plate separation, the most uniform orientation over the entire area of the plates that is practicable, and no dust particles or other nucleation centers inside the cell. Because this requirement means that the spacers are only permitted in the borders of the display cell, large-area displays are impractical, since very thick and extremely flat glass substrate plates would be required. It goes without saying that this would entail a very costly production technology.

SUMMARY OF THE INVENTION

Accordingly, one object of this invention is to provide a new and improved addressing method and liquid crystal display of the type mentioned above wherein the information no longer has to be refreshed, but an immediate, constant and high-contrast display is achieved over the entire viewing area.

It is a further object of this invention to make possible a large-area, easily-manufacturable, highly-multiplexable display utilizing the bistability effect.

The invention is based on the fact that in a bistable liquid crystal display there are driving voltages where two different optical states occur, but that only one of these states is stable. This means that the display transforms from a first state to a second state after a certain length of time, which is dependent upon the applied voltage and the number of nucleation centers inside the layer. This property of bistable liquid crystals is made use of by this invention, namely that the switching time between two different optical states is mainly determined by the storage time of the optically metastable state. The invention also uses the fact that the first optical state is stable only above a first limiting voltage and that the second state is stable only below a second limiting voltage. In order to obtain a sufficiently high degree of multiplexing, it is also important that the thickness-to-pitch ratio of the liquid crystal layer be chosen between 0.5 and 1.75.

The invention offers the considerable advantage in that the entire active area of a liquid crystal display employing the hysteresis effect can now be written simultaneously, i.e. page-at-a-time. The old information is erased with a writing pulse and the new information is written using the usual multiplexing technique, i.e. the same one that is used in non-bistable liquid crystal displays. By this means the display no longer has to be constantly refreshed. Moreover, an optimal contrast ratio is achieved since different driving voltages are applied to the select and non-select display elements. Such an addressing method is therefore especially suitable for videotext applications or for storage oscilloscopes.

The liquid crystal display of this invention makes it possible to use optimally the addressing method of this invention. In non-bistable displays it is advantageous to distribute spacer particles uniformly over the whole area of the cell plates in order to obtain a fast response time. Using this same technique, large-area and highly-multiplexable bistable liquid crystal displays can now be economically produced.

The information can also be written row-wise on a display exhibiting hysteresis in such a way that the displayed information does not slowly fade away. The new information is displayed row-wise by means of a writing voltage followed with conventional multiplexing, which makes periodic refreshing of the displayed information unnecessary. This method is therefore especially suitable for displays used in word processors and small, portable computers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
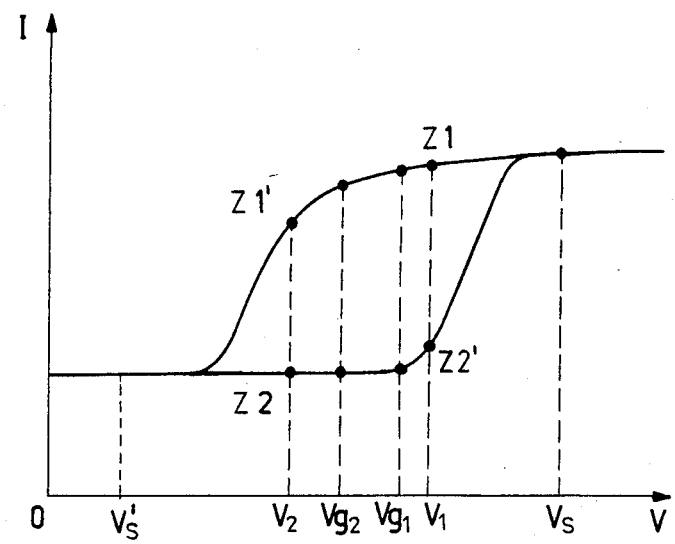
FIG. 1 is a graph which schematically illustrates the brightness-voltage curve of a bistable liquid crystal display.

Referring now to the drawings, wherein like reference numerals designate identical or corresponding parts throughout the several views, and more particularly to FIG. 1 thereof, in the graph there shown the voltage is plotted along the abscissa and the brightness I is plotted along the ordinate. For a given voltage in the region of the hysteresis loop the display adopts one of two possible optical states. For a driving voltage $V_1$ lying above the limiting voltage $V_{g1}$ the first optical state Z1 (bright) is stable. The second optical state Z2' (dark) is metastable at this voltage and transforms into the the first state Z1 after a certain period of time. The storage time of the metastable state is dependent upon the driving voltage and is shorter the further the driving voltage $V_1$ is away from the limiting voltage $V_{g1}$. For a driving voltage below the limiting voltage $V_{g2}$ the second optical state Z2 (dark) is stable. In this case the first optical state Z1' (bright) is metastable and therefore transforms into the second state Z2 after a certain period of time. The situation here is analogous to the case for the driving voltage $V_1$, namely the further the driving voltage $V_2$ is away from the limiting voltage $V_{g2}$, the shorter the storage time of the first optical state Z1'. By applying a writing voltage $V_s$ lying outside the hysteresis loop to a display element and through subsequent application of a driving voltage $V_1$ or $V_2$, the display element is transferred to a defined optical state Z1 or Z2. It goes without saying that, for example, through appropriate choice of the liquid crystal material or through the use of polarizers, the first optical state Z1 could be dark and the second optical state Z2 could be bright.

The limiting voltages $V_{g1}$ and $V_{g2}$ can be precisely determined from a microscopic examination of the display cell. For this determination the applied operating voltage is slowly increased starting from 0 V. Stripe-like optical phenomena occur in the region between the limiting voltages $V_{g1}$ and $V_{g2}$, which immediately disappear as soon as the operating voltage is above the first limiting voltage $V_{g1}$ or below the second limiting voltage $V_{g2}$. There are, however, liquid crystal mixtures showing hysteresis where the stripe-like phenomena mentioned above do not occur. In this case $V_{g1}$ and $V_{g2}$ coincide to a single limiting voltage above which one optical state is stable and below which the other optical state is stable.

Figure 2:
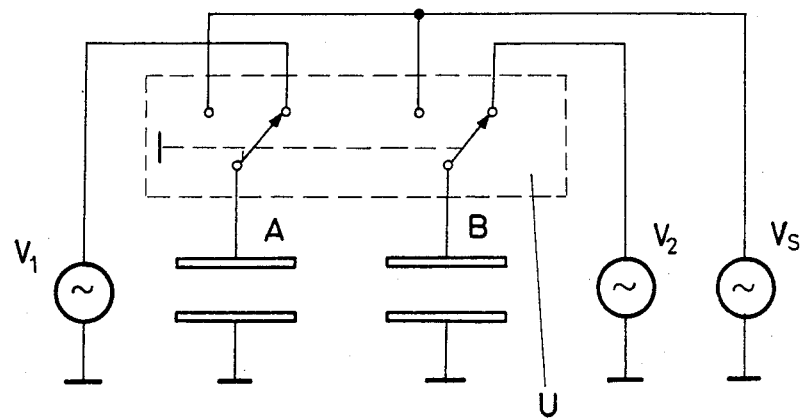
FIG. 2 is a schematic diagram illustrating a switching arrangement using two liquid crystal cells to clarify the operating principle of the invention.

The main principle of operation of the method of this invention will now be explained with the help of a liquid crystal display which has been greatly simplified. A and B in FIG. 2 designate two similarly-constructed liquid crystal cells.

Cell A lies at a voltage $V_1$ and cell B at a voltage $V_2$. $V_1$ and $V_2$ therefore correspond to the driving voltages as they are defined in FIG. 1. By means of the double-pole-double-throw switch U, a voltage $V_s$ can be imposed onto the two liquid crystal cells A, B which is large enough so that it lies to the right of the hysteresis loop in FIG. 1 ("first addressing method"). $V_s$ is preferably applied to both cells A, B. The switch U is then switched back to its illustrated postion. The cells A, B now adopt the optical states Z1, Z1' (FIG. 1). Cell B, however, is in the metastable optical state (point Z1' in FIG. 1). Depending upon how large the voltage difference $V_{g2} - V_2$ is, this metastable state transforms more or less rapidly and without outside help into the stable state (point Z2 in FIG. 1), while cell A remains in the stable state Z1.

As just pointed out, the time it takes for the change of states in cell B is dependent upon the voltage difference $V_{g2} - V_2$. The closer $V_2$ lies to $V_{g2}$, the longer the transition takes to go from point Z1' to point Z2.

The writing voltage $V_s'$ can also lie to the left of the hysteresis curve (FIG. 1) ("second addressing method") and is preferably 0 V. In the second addressing method, it is preferable that $V_s = 0$ V be applied to both cells for 100 ms. After this time the switch U is switched back to its initial postition. The cells A, B now adopt the optical states Z2, Z2'.

Cell A adopts the metastable optical state (point Z2' in FIG. 1). Depending upon how large the voltage difference $V_1 - V_{g1}$ is, this metastable state transforms more or less rapidly and without outside help, into the stable state (point Z1 in FIG. 1), while cell B remains in the stable state Z2.

As just pointed out, the time it takes for the change of states in cell A is dependent upon the voltage difference $V_1 - V_{g1}$. The closer $V_1$ lies to $V_{g1}$, the longer the transition takes to go from point Z2' to point Z1.

For the multiplex operation that is usual for liquid crystal displays, one is not free in the choice of the driving voltages $V_1$ and $V_2$. For a given ratio of multiplexing, i.e. the number of front electrodes that are common to a given rear electrode in the display (or vice versa), the ratio $V_1/V_2$ is fixed and approaches the value 1 as the multiplexing rate is increased (see IEEE Trans. Electron. Devices, Vol ED-21, No. 2, February 1974, pages 146–155).

This means in the above case that only $V_1$ or only $V_2$ can be freely chosen. In the first addressing method ($V_s \gg V_1$) the driving voltage $V_1$ is set as close as possible to $V_{g1}$. In the second addressing method ($V_s \ll V_2$) $V_2$ is set as close as possible to $V_{g2}$.

Figure 3:
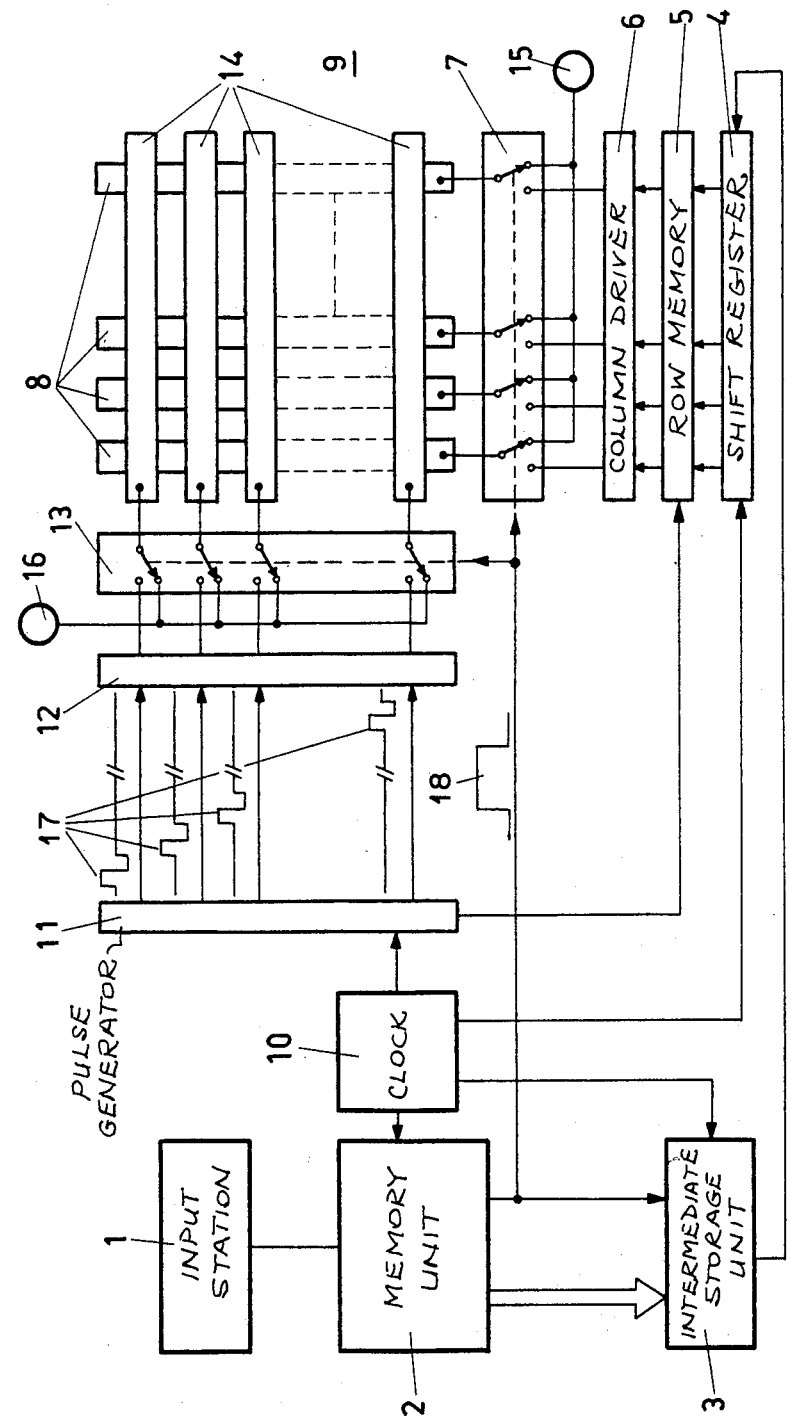
FIG. 3 is a schematic diagram of an example of a switching arrangement applying the addressing technique of this invention for multiplex operation.

FIG. 3 shows a block diagram of the realization of the addressing methods of this invention on a liquid crystal dot matrix display 9. In this diagram an input station 1, e.g. a telephone with modem, is attached to a memory unit 2. An intermediate storage unit 3 is connected to the memory unit 2. The intermediate storage unit 3 is connected to a shift register 4 which is in turn connected to a row memory 5 and a column driver 6. The output of the column driver 6 is connected via a first switching unit 7 to the column electrodes 8 of the liquid crystal dot matrix display 9. A clock 10 is connected to the memory unit 2, the intermediate storage unit 3, the shift register 4 and a pulse generator 11, which produces a sequential series of pulses 17. The pulse generator 11 is connected to a row driver 12, whose outputs are connected via a second switching unit 13 to the row electrodes 14. The switching units 7 and 13 consist of a plurality of switches which can all by synchronously actuated with a writing pulse 18, which is produced by the memory unit 2. The switching unit 7 is also connected to a voltage source 15, and the switching unit 13 to a voltage source 16. The switching units 7 and 13 preferably consist of semiconductor switches, such as, for example, CMOS transistors. Of course the shift register 4, the row memory 5, the column driver 6 and the switching unit 7 can be designed as an integrated unit. The same also applies to the pulse generator 11, the row driver 12 and the switching unit 13.

The circuit arrangement of FIG. 3 is particularly suitable for the addressing method of this invention. The data given through the input station 1 is stored page-wise in the memory unit 2. The next page of information to be displayed is stored in the intermediate storage unit 3. In order to bring this information onto the display, a writing voltage pulse of about 30 ms duration is applied to the switching units 7 and 13 so that the voltage source 16 is connected to all the row electrodes 14 and the voltage source 15 is connected to all the column electrodes 8.

Figure 4:
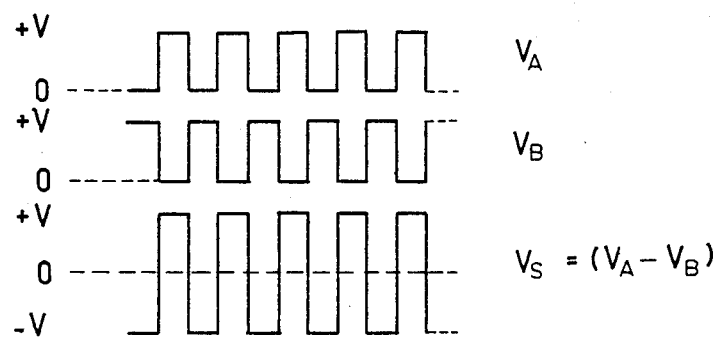
FIG. 4 is a timing diagram illustrating the square-wave voltage waveform used to produce the writing voltage.

If the first addressing method is used then, for example, the voltage source 15 delivers the square-wave voltage $V_A$ illustrated in FIG. 4 and the voltage source 16 the square-wave voltage $V_B$. These waveforms are phase-shifted so that the writing voltage $V_s$ is applied to every display element in the liquid crystal display 9. The writing voltage $V_s$ is an ac voltage in order to prevent the decompositon of the liquid crystal.

No voltage sources 15, 16 are required for the second addressing method. The connections leading to the voltage sources are grounded, so that the writing voltage is exactly zero.

Immediately after the writing pulse, the lines of the page stored in the intermediate storage unit 3 are moved into the shift register 4. The page is then written by means of the usual multiplexing procedure. For this purpose a sequential series of pulse signals are required which are delivered by the pulse generator 11. These pulses are fed to the row driver 12, so that the desired driving voltages will appear at the display elements of the matrix cell (see "Electroniker", CH No. 2/1980, pages EL1–EL15). The procedure described above is a simplified explanation of how the display is written. The clock 10 insures that the various processes take place in their proper sequences.

Figure 5:
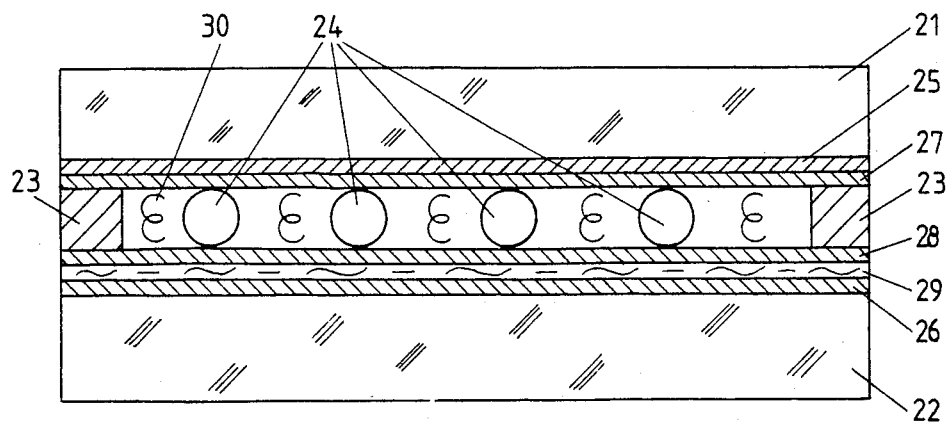
FIG. 5 is a cross-sectional view of the liquid crystal display of this invention.

The display cell of this invention shown in FIG. 5 consists of two glass substrate plates 21 and 22 with a seal 23 and spacers 24 of glass fibers or glass balls, such as are commonly used in twisted nematic cells. The dimensions of the spacers 24 are so small that they cannot be perceived under normal observation. The glass fibers used have a diameter of 8 μm and a maximal length of 200 μm. In the case of glass balls the diameter is 8 μm. The spacers 24 are distributed over the active display area with a number density of 2 to 10 pieces per mm². Transparent electrode layers 25 and 26 and orientation layers 27 and 28 are deposited on the substrate plates 21 and 22. The orientation layers are produced by means of oblique evaporation of a 10 nm thick SiO layer under a grazing angle of 5°. The liquid crystal molecules receive a tilt angle α of the optic axis of 28° measured with respect to the surface of the plates. The substrate plates 21 and 22 are assembled to form a cell in such a way that the orienting layers 27 and 28 are antiparallel to each other. The optic axes of the liquid crystal molecules at the upper and lower substrate plates 21 and 22 are therefore parallel. The cell is operated in the reflective mode and to this end includes an internal reflector 29 consisting of aluminum pigment particles deposited upon the electrode layer 26 of the lower substrate plate 22. Such a reflector is known, for example, from the German patent DE-A-26 29 765. It goes without saying that the well-known external reflector is also ideally suited for this purpose. For the guest-host liquid crystal 30, a mixture of 98.25 wt.% of the black guest-host mixture ZLI-1841 from Merck, Germany with the right-handed chiral additive of 1.75 wt.% CB 15 from The British Drug House, England is filled into the cell. The natural chiral pitch of this mixture is 7.03 μm and the cholesteric helix makes one full turn in the cell. The cell is a dot matrix display with 45 cm² active display area and has a layer thickness d of 8.1±0.2 μm. The ratio of thickness d to pitch p therefore amounts to 1.15.

In another example, a mixture of the black liquid crystal mixture ZLI-1841 with 2.14 wt.% of the left-handed chiral additive cholesteryl nonanoate and 0.61 wt.% of a blue anthraquinone dye was filled into the cell. The pitch p is here 11.7 μm and the ratio of layer thickness to pitch then amounts to 0.69. In this case the orientation directions of the orienting layers 27 and 28 are perpendicular to each other, which generates a 270° twist in the liquid crystal. It should be noted that the arrangement of the orienting layers 27 and 28 is in accord with the twisting sense of the chiral additive. It should be pointed out that equally excellent performance is achieved using a cell where only one orienting layer is obliquely evaporated and the other orienting layer consists of a rubbed polymer layer or the like. It is apparantly sufficient for only one orienting layer to impose a pretilt angle of 5° or more on the liquid crystal molecules. A 35 row matrix has a very good contrast ratio using the addressing method of this invention. The switching of the display when the information is changed is scarcely noticeable and absolutely no flickering occurs.

Figure 6:
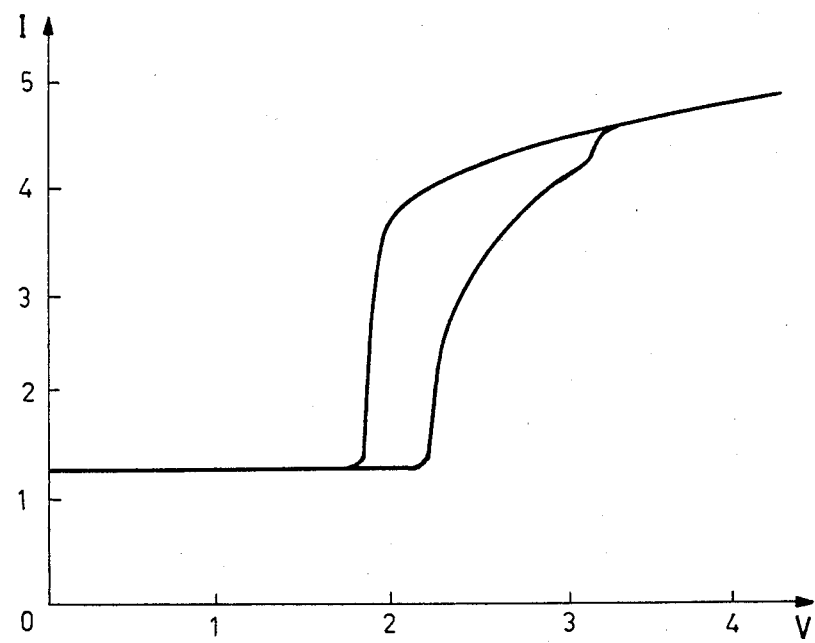
FIG. 6 is a graph which shows the brightness-voltage curve of a liquid crystal display specially prepared to use the addressing method of this invention.

The brightness-voltage curve measured for the cell of the first example is shown in FIG. 6; it was recorded with a slew rate of 30 mV/s at a temperature of 20° C. The applied driving voltage V in volts is plotted along the X-axis and the brightness in arbitrary units is plotted along the Y-axis.

Figure 7:
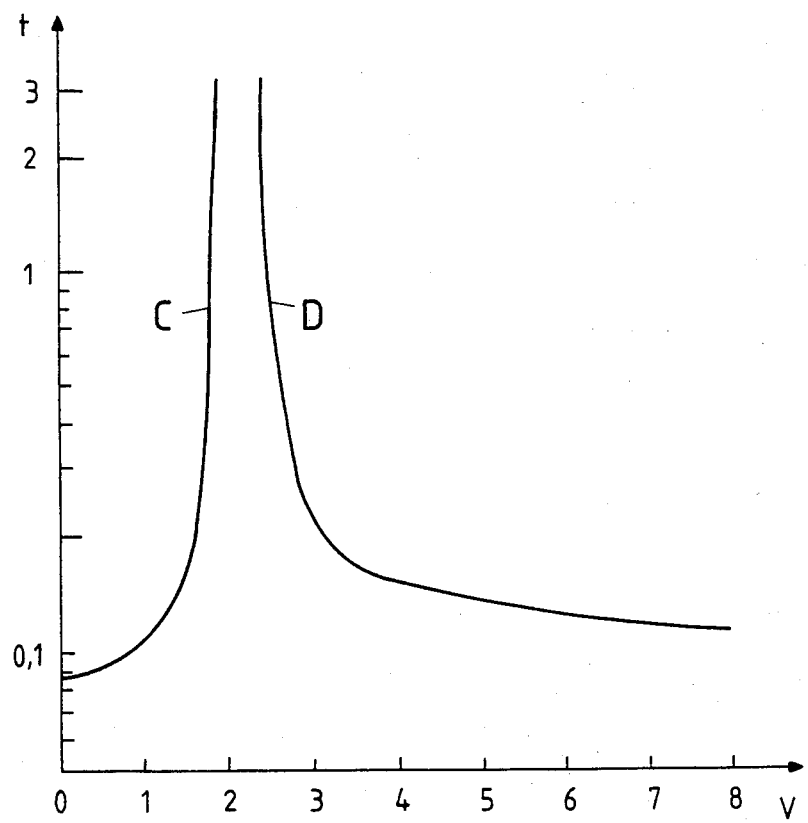
FIG. 7 is a graph of the dependence of the minimal writing time on the driving voltage in the above liquid crystal display.

In FIG. 7 the minimal writing time at different driving voltages is shown plotted for the cell of the first example. The X-axis designates the applied driving voltage V in volts and the Y-axis the minimal writing time t in seconds (logarithmic scale). Curve C shows the minimal writing time of the second optical state (dark). Curve D shows the minimal writing time of the first optical state (bright).

To determine the minimal writing time of the second optical state (curve C) a writing voltage pulse of 8.0 V amplitude and 21 ms width is applied. The minimal writing time at the applied driving voltage is then the time required to achieve 90% of the final intensity of the second optical state (dark).

The times indicated in FIG. 7 include the length of the 21 ms wide writing pulse, so that the actual time required to write the display—the effective writing time—is plotted along the Y-axis. The first driving voltage $V_1$, which in this case is also the first limiting voltage $V_{g1}$, was readily determined to be 2.15 V in this display cell. When a certain minimal writing time is required, then the maximum number of lines N which can be multiplexed follow from the the equation $$\frac{V_1}{V_2} = \sqrt{\frac{\sqrt{N}+1}{\sqrt{N}-1}},$$

obtained form the article in IEEE Trans. Electron. Devices already mentioned. For a minimal writing time of, say one second, a driving voltage $V_2 = 1.82$ V follows from FIG. 7, so that a maximum of 37 lines can be addressed using the method of this invention.

To determine the minimal writing time of the first optical state (curve D) a writing voltage pulse of 0 V amplitude and 100 ms width is applied. Considerations analogous to the case for curve C are also valid here. For the display cell mentioned above the second limiting voltage $V_{g2}$—and thus the second driving voltage $V_2$—and the first limiting voltage $V_{g1}$ are the same, namely 2.15 V. If a minimum writing time of one second is required in this case, then the first driving voltage $V_1$ is 2.48 V and a maximum of 50 lines can be multiplexed using the method of this invention.

The data for the cell of the second example of this invention measured at a multiplex ratio of 96:1 at a temperature of 298° K. are as follows:

| | |
|---|---|
| first driving voltage | $V_1 = 1.80$ V |
| second driving voltage | $V_2 = 1.63$ V |
| data pulse amplitude | 1.21 V |
| strobe pulse amplitude | 11.88 V |
| contrast ratio | 2.1:1 |
| sum of turn-on and turn-off switching times | 650 msec for a writing voltage of 8 V for 20 msec |
| | 2 sec for ordinary multiplex operation |

In order to ensure a sufficiently high ratio of multiplexing, it is necessary that the number of turns of the cholesteric helix in the cell be as low as possible. On the other hand the liquid crystal in the non-addressed state should absorb the incident light as completely as possible so that polarizers will not be required. These conditions are ensured by the requirements of the invention wherein the liquid crystal layer thickness is selected to be less than 10 μm, and that the ratio of layer thickness d to pitch length p of the guest-host liquid crystal mixture is selected to be greater than or equal to 0.5 and less than 1.75, in the course of which the total twist angle of the liquid crystal molecules in the cell is selected to be between 180° and 630°, and preferably between 200° and 400°.

Figure 8A:
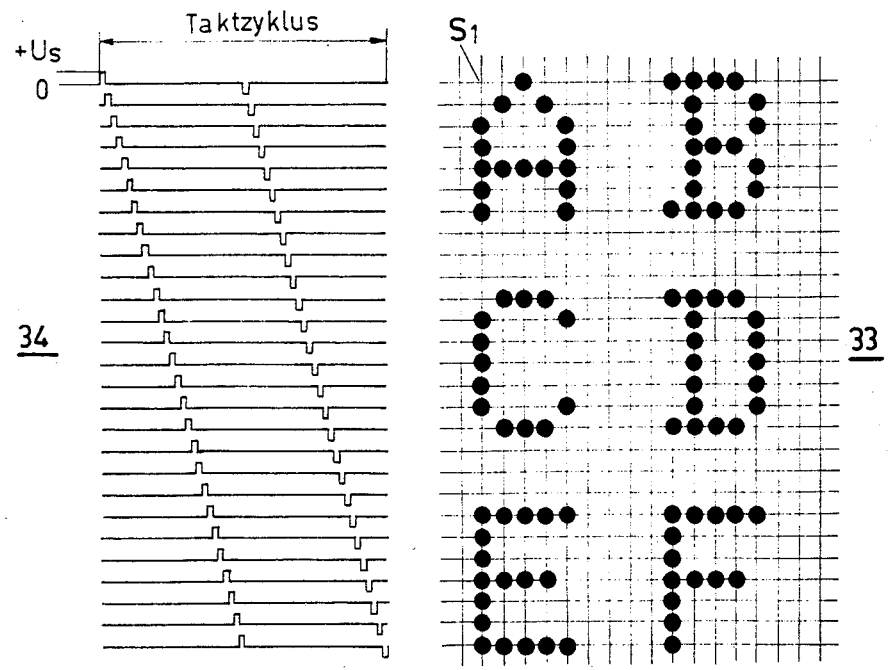
FIG. 8a, 8b and 8c are timing diagrams showing strobe signals by which the process of information change in a display matrix is produced upon application of the strobe signals to respective of the row electrodes of the display matrix.
Figure 8B:
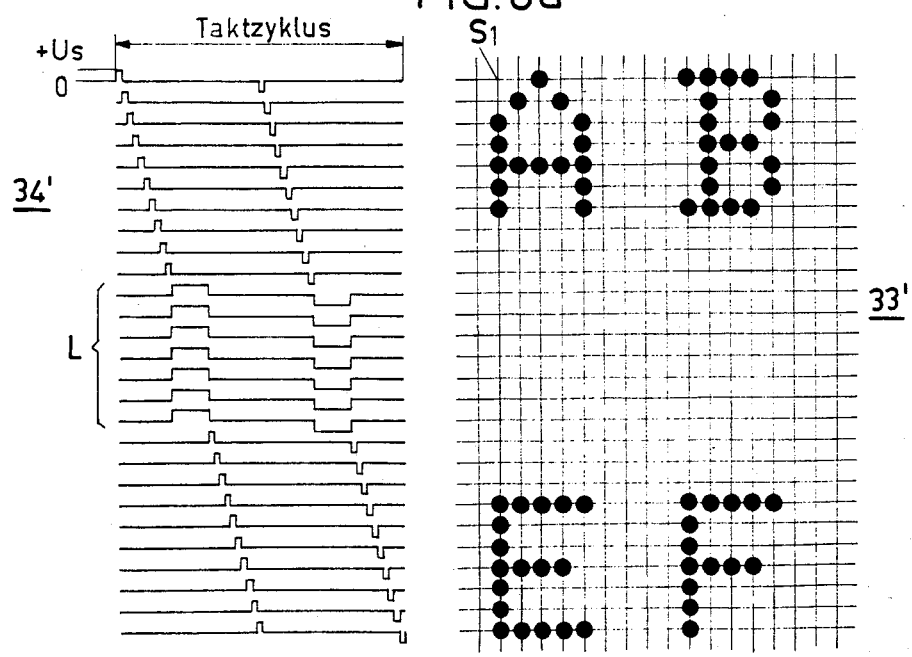
Figure 8C:
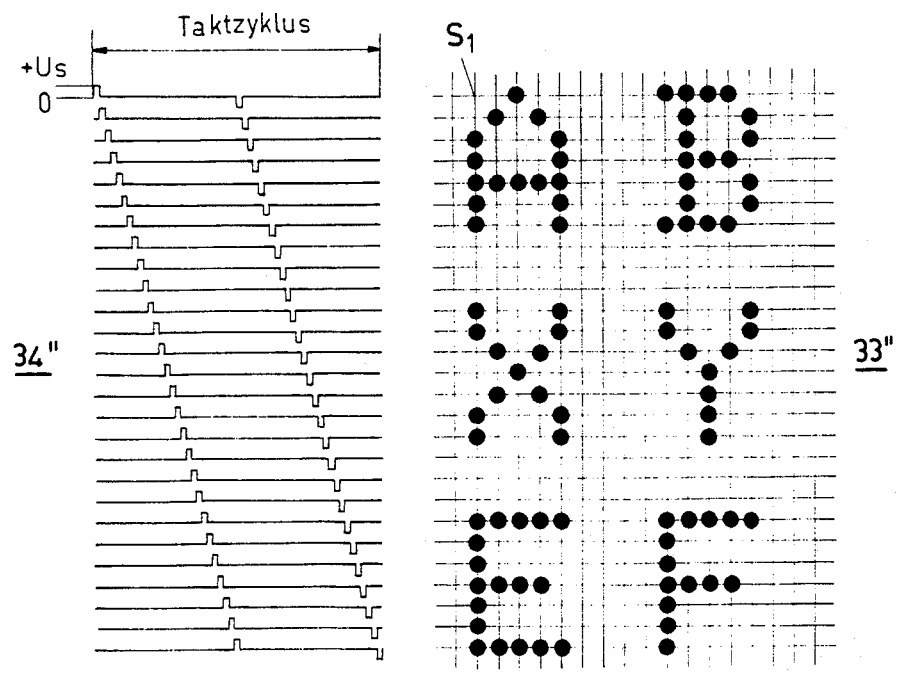
Figure 9:
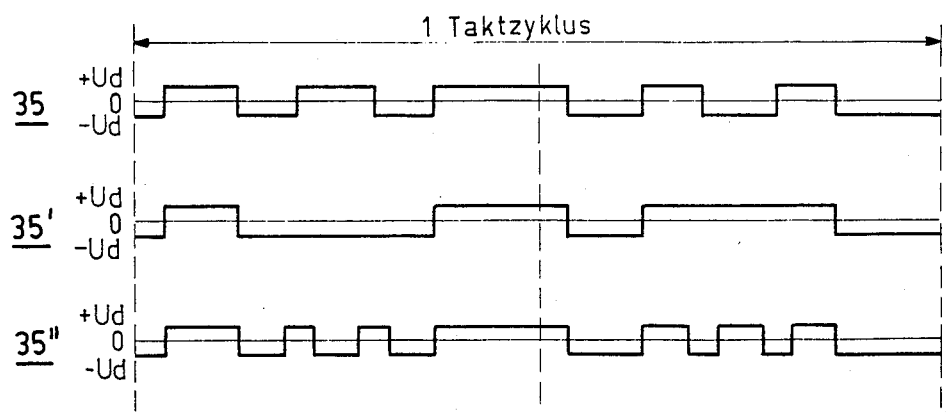
FIG. 9 is a timing diagram showing the data signals fed to the first column electrode for the three different display states corresponding to FIGS. 8a to 8c.

A further development of the addressing method of this invention will now be explained by referring to FIGS. 8a, 8b, 8c and 9. FIGS. 8a, 8b and 8c show how the information is changed on the second character line of a 27 row dot matrix display 33, 33', 33". Each character line comprises 7 matrix rows, with an empty space between each character line comprising 3 matrix rows. The alphanumeric characters themselves are depicted using a 5×7 dot matrix format. To the left of the display 33, 33', 33" are the strobe signals 34, 34', 34" which are applied to the individual matrix rows. The scanning cycle is 27 ms long, giving a repeating frequency of 37.04 Hz. The width of a strobe signal is 0.5 ms, and its amplitude is designated by $U_s$. The data signals 35, 35', 35" fed to the first matrix column S1 of the displays in FIGS. 8a, 8b and 8c are shown in FIG. 9. The repeating period of these signals is also 27 ms, so that conventional multiplex addressing is used in the case of FIGS. 8a and 8c, as it is known from the IEEE publication mentioned earlier. The respective driving voltage $V_1$, $V_2$ (see FIG. 1) appearing across a dot-shaped display element is the root-mean-squared value of the voltage difference between the strobe pulse signal 34, 34" and the data signal 35, 35". As a result the selected display elements (bright) receive the driving voltage $V_1$ and the non-selected display elements (dark) the driving voltage $V_2$. Should a new character line be written, then the old information must first be erased (FIG. 8b). To this end the display is subdivided into a holding region and a writing region. The display elements in the holding region continue to be supplied with such multiplexing signals so that the driving voltages $V_1$ or $V_2$ are generated. The display elements in the writing region, however, receive the writing voltage $V_s$. To this end all matrix rows belonging to the character line which is to be rewritten receive the same writing signal S. The writing signal S is designated by a pulse having an amplitude of $U_h$ and a 3.5 ms width. The data signals are modified in synchronism to this writing signal in such a way that the effective voltage at the display elements is the same as the writing voltage $V_s$. Such a modified data signal 35' for the first matrix column is illustrated in FIG. 9. By this means the information on the first and third character lines (the letters AB and EF) is preserved, while the information on the second character line is changed (from CD to XY).

The strobe signals 34, 34' 34" and the data signals 35, 35', 35" are inverted after every half scanning cycle in order to prevent average dc voltages from appearing across the matrix elements. These dc voltages would otherwise gradually decompose the liquid crystal through electrochemical processes. The ratio between the driving voltages follows from the IEEE article mentioned above to be $$\frac{V_1}{V_2} = \sqrt{\frac{\sqrt{N}+1}{\sqrt{N}-1}} . \tag{1}$$

The ratio between the writing voltage $V_s$ and the driving voltage $V_2$ can be computed from the addressing signals referred to above:

$$\frac{V_s}{V_2} = \frac{1}{\sqrt{2}} \sqrt{\frac{n\sqrt{N} x^2 + 2nx + \sqrt{N}}{\sqrt{N}-1}} , \tag{2}$$

with $$x = \frac{U_h}{U_s}$$

n = number of matrix rows to be rewritten,
N = total number of matrix rows.

The technical realization of the addressing method is particularly simple when x=1, i.e. $U_h=U_s$. For the example illustrated (N=27, n=7) $V_1/V_2=1.215$ and $V_s/V_2=2.573$. The writing voltage $V_s$ therefore certainly lies outside of the hysteresis loop. However for a matrix display with more matrix rows, N, or fewer rows to be rewritten, n, it can be necessary to choose an x larger than 1 in order that the ratio $V_s/V_2$ will remain sufficiently large.

If the second addressing method (illustrated in FIG. 2) is to be used, then the writing voltage $V_s'$ should lie to the left of the hysteresis loop (FIG. 1). In this case $U_h=0$ and the ratio $V_s'/V_2$ is derived as:

$$\frac{V_{s'}}{V_2} = \frac{1}{\sqrt{2}} \sqrt{\frac{\sqrt{N}}{\sqrt{N}-1}} \tag{3}$$

For the above example (N=27, n=7) $V_s'/V_2=0.787$.

Figure 10A:
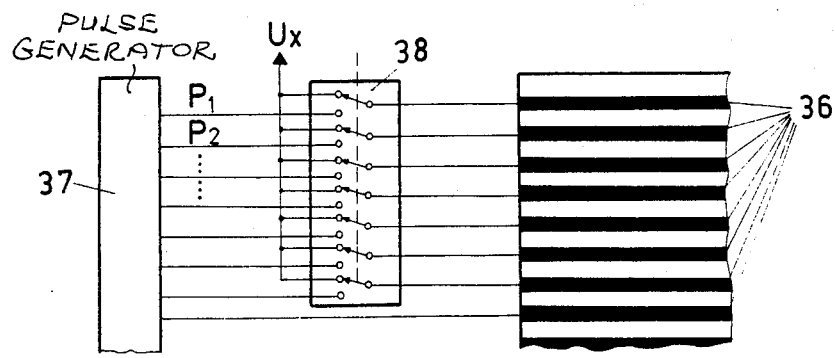
FIG. 10a and 10b are block diagram of a portion of a switching circuit that uses the addressing method of this invention.
Figure 10B:
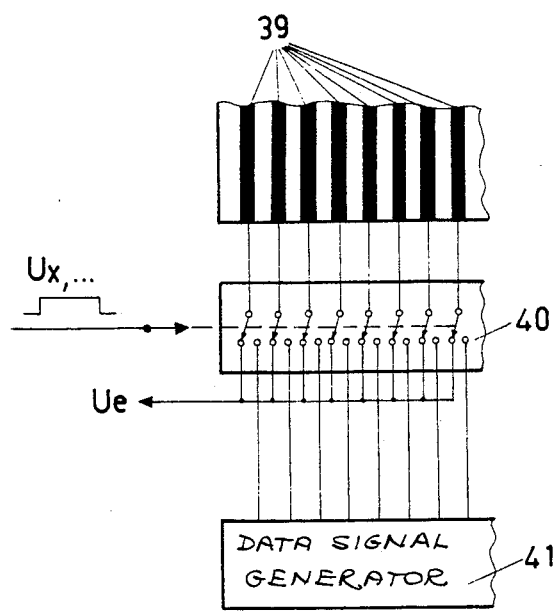
Figure 11:
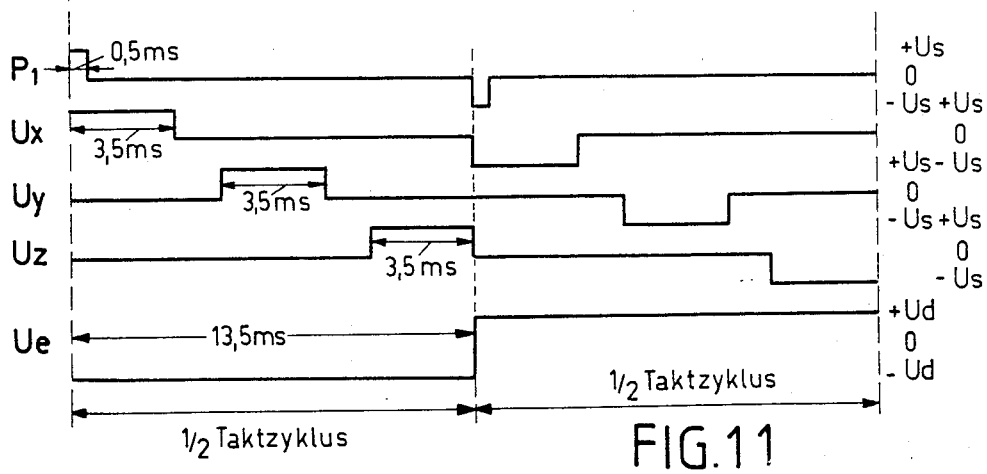
FIG. 11 is a timing diagram of the driving waveforms applied to the switching arrangement shown in FIG. 10.

An exemplary switching arrangement for the addressing method of this invention is illustrated in FIG. 10. FIG. 10a shows a portion of the lower substrate plate with row electrodes 36 which are either directly connected to a pulse generator 37 or electrically connected to the pulse generator via a CMOS switch 38. FIG. 10b shows a portion of the upper substrate plate with column electrodes 39 which are electrically connected via a CMOS switch 40 to a data signal generator 41. The substrate plates, together with a boarder seal and spacers, form the usual display cell as shown in FIG. 5 in which a cholesteric liquid crystal is filled. If the seven row electrodes 36 of the upper character line belong to the holding region of the display, then the CMOS switch 38 connects the row electrodes 36 to the pulse generator 37 where they receive the strobe signals P1, P2, ... illustrated in FIG. 8. The first strobe signal P1, with a repeating cycle of 27 ms, is illustrated again in FIG. 11. At the same time the column electrodes 39 are also connected to the data signal generator 41 via the CMOS switch 40 so that data signals similar to the signals 35" in FIG. 9 are applied. If the upper character line is now declared to be in the writing region of the display, then the CMOS switch 38 is actuated with a 81 ms wide (three scanning cycles) voltage pulse so that all row electrodes 36 of the character line receive the writing signal $U_x$. The writing signals $U_x$, $U_y$, and $U_z$ for the three character lines displaying the letters AB, CD (XY), EF are illustrated in FIG. 11 (see also FIG. 8b). The writing signal $U_x$ simultaneously actuates the CMOS switch 40 so that the square-wave signal $U_e$ (FIG. 11) is applied to the column electrodes 39 for the duration of the pulse (3.5 ms). By this means the data signals are modified in a similar way to the data signal 35' shown in FIG. 9.

The advantage of this embodiment of the present invention is that all the strobe and writing signals have the same amplitude. The required voltage source and the associated logic circuits are therefore especially simple to design.

In principle the amplitudes of the applied signals can also be different; e.g. the amplitude of the writing signal $U_h$ can be chosen to be considerably higher than the amplitude of the strobe signal $U_s$ and the data signal $U_d$.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for addressing a multiplexable, bistable liquid crystal display having a plurality of liquid crystal display elements each of which can adopt a first optical state and a second state, comprising the steps of:

applying a writing voltage for a predetermined time period to at least one of said elements regardless of the optical state of said at least one of said elements;

applying a first driving voltage to said at least one of said elements after applying said writing voltage thereto when said at least one of said elements is to be put into or remain in the first optical state, said first driving voltage being greater than a first limiting voltage above which the second optical state spontaneously transforms into the first optical state; and applying a second driving voltage to said at least one of said elements after applying said writing voltage thereto when said at least one of said elements is to be put in said second optical state, said second driving voltage being smaller than a second limiting voltage below which the first optical state spontaneously transforms into said second optical state, said second limiting voltage being less than or equal to said first limiting voltage;

wherein said writing voltage is selected to have a value outside a voltage range extending from said first driving voltage to said second driving voltage.

2. A method according to claim 1, further comprising the steps of:

dividing the display elements into at least one writing region in which information being displayed by said display elements can be changed and into at least one holding region in which no changes in the optical states of the display elements can be made, and simultaneously applying said writing voltage to all the display elements in said at least one writing region.

3. A method according to claims 1 or 2, wherein the writing voltage is larger than the first limiting voltage, the first driving voltage lies near the first limiting voltage and the voltage difference between the second limiting voltage and the second driving voltage has a predetermined multiplexing ratio, wherein with increasing multiplexing ratio, the ratio of the first driving voltage to the second driving voltage approaches unity.

4. A method according to claim 3, wherein the writing voltage is at least one and one-half times as large as the first limiting voltage.

5. A method according to claims 1 or 2, wherein the writing voltage is smaller than the second limiting voltage, the second driving voltage lies near the second limiting voltage and the voltage difference between the first limiting voltage and the first driving voltage has a predetermined multiplexing ratio, wherein with increasing multiplexing ratio, the ratio of the first driving voltage to the second driving voltage approaches unity.

6. A method according to claim 5, wherein the writing voltage is 0 V.

7. A method according to claims 1 or 2, wherein the writing voltage has a pulse duration from 5 to 200 ms.

8. A method according to claims 1 or 2, wherein the ratio between the first driving voltage and the second driving voltage is at most 3:1.

9. A method according to claims 1 or 2, wherein the multiplexing ratio is at least 2:1.

10. A multiplexable, bistable liquid crystal display comprising:

parallel substrate plates having inner surface defining respective parallel planes which, with a border seal, form a cell;

a guest-host liquid crystal filled in the cell, said crystal comprising a nematic liquid crystal with positive dielectric anistropy, pleochroic dyes and a chiral additive;

electrode layers and orienting layers on the inner surfaces of the substrate plates, said electrode layers, orienting layers and liquid crystal filled in the cell defining a plurality of bistable display elements each of which can adopt a first optical state and a second optical state;

wherein at least one of the orienting layers induces a pretilt angle (a) on liquid crystal molecules adjacent the at least one of the orienting layers, said pretilt angle (a) being larger than 5° measured from the plane of the substrate;

said liquid crystal layer having a thickness (d) smaller than 10 m;

said pretilt angle (a) being smaller than 40°;

said guest-host liquid crystal having a layer thickness (d) and a pitch length (p) defining a ratio (d/p) greater than or equal to 0.5 and less than 1.75, such that a total twist of the liquid crystal molecules in the cell lies between 180° and 630°;

spacer particles distributed throughout said cell; and means for addressing said plural display elements, comprising, means for applying a writing voltage for a predetermined time period to at least one of said display elements regardless of the optical state of said at least one of said elements, means for applying a first driving voltage to said at least one of said elements after applying said writing voltage thereto when said at least one of said elements is to be put into or remain in the first optical state, said first driving voltage being greater than a first limiting voltage above which the second optical state spontaneously transforms into the first optical state, and means for applying a second driving voltage to said at least one of said elements after applying said writing voltage thereto when said at least one of said elements is to be put in said second optical state, said second driving voltage being smaller than a second limiting voltage below which the first optical state spontaneously transforms into said second optical state, said second limiting voltage being less than or equal to said first limiting voltage;

wherein said writing voltage is selected to have a value outside a voltage range extending from said first driving voltage to said second driving voltage.

11. A liquid crystal display according to claim 10, wherein one of the orienting layers is rubbed.

12. A liquid crystal display according to claims 10 or 11, wherein the spacers comprise glass fibers or glass balls.

13. A liquid crystal display according to claim 10, comprising:

a reflector mounted adjacent one of said substrate plates.

14. A liquid crystal display according to claims 1 or 2, comprising:

an internal reflector made with aluminum pigment and disposed between said substrate plates.

15. A liquid crystal display according to claim 12, comprising:

an internal reflector made with aluminum pigment and disposed between said substrate plates.

16. A liquid crystal display according to claim 10, further comprising:

multiplexing means for dividing the display elements into at least one writing region in which information being displayed by said display elements can be changed and into at least one holding region in which no changes in the optical states of the display elements can be made, and said means for applying said writing voltage includes means for simultaneously applying said writing voltage to all the display elements in said at least one writing region.

* * * * *